(12) United States Patent
Flannery

(10) Patent No.: US 6,275,211 B1
(45) Date of Patent: Aug. 14, 2001

(54) WASTE HEAT ACTUATED DISPLAY BACK LIGHT

(75) Inventor: Michael R. Flannery, Sioux City, IA (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 08/985,603

(22) Filed: Dec. 5, 1997

(51) Int. Cl.[7] .................................................. G09G 3/36
(52) U.S. Cl. ............................ 345/102; 345/87; 349/61
(58) Field of Search ............................. 345/87, 102, 901; 349/61–72; 361/687, 700, 701

(56) References Cited

U.S. PATENT DOCUMENTS

| | | | |
|---|---|---|---|
| 4,593,199 | 6/1986 | Yaniv et al. | 250/484.1 |
| 4,639,722 | 1/1987 | Urabe et al. | 340/784 |
| 4,976,514 | 12/1990 | Murata et al. | 350/345 |
| 5,143,433 | 9/1992 | Farrell | 362/29 |
| 5,255,109 | 10/1993 | Klein | 359/43 |
| 5,272,327 | * 12/1993 | Mitchell et al. | 250/205 |
| 5,299,038 | 3/1994 | Hamada et al. | 359/49 |
| 5,406,305 | 4/1995 | Shimomura et al. | 345/102 |
| 5,410,497 | * 4/1995 | Viletto | 364/708.1 |
| 5,438,198 | 8/1995 | Ebitani et al. | 250/330 |
| 5,453,855 | 9/1995 | Nakamura et al. | 359/49 |
| 5,483,503 | 1/1996 | Kimball | 368/67 |
| 5,500,054 | 3/1996 | Goldstein | 136/253 |
| 5,572,027 | 11/1996 | Tawil et al. | 250/336.1 |
| 5,598,320 | * 1/1997 | Toedtman et al. | 361/687 |
| 5,606,341 | 2/1997 | Aquilera | 345/87 |
| 5,951,915 | * 9/1999 | Hase et al. | 252/301.4 |

FOREIGN PATENT DOCUMENTS

| | | | |
|---|---|---|---|
| 3511602A1 | 10/1986 | (DE) | G01R/13/00 |
| 0564092 | 2/1993 | (EP) . | |
| 0588084 | 3/1994 | (EP) . | |
| 52-135295 | 11/1977 | (JP) . | |
| 96/28005 | 9/1996 | (WO) . | |

* cited by examiner

*Primary Examiner*—Bipin Shalwala
*Assistant Examiner*—Jimmy H. Nguyen
(74) *Attorney, Agent, or Firm*—Schwegman, Lundberg, Woessner & Kluth, P.A.; Kenneth J. Cool

(57) ABSTRACT

A display apparatus is provided having a back light generated by waste heat of a system. A thermally illuminated strip is disposed on a surface of the display apparatus. The system has heat generating components, such as a CPU, which produce excess waste heat. A heat pipe conveys the heat from the heat generating components to the thermally illuminated strip. Once the heat generating component warms up, the thermally illuminated strip is illuminated by the conveyed heat and provides back lighting for the display apparatus. Although several other applications are appropriate, one particular application for the display apparatus is for a status LCD within a computer.

27 Claims, 2 Drawing Sheets

WASTE HEAT ACTUATED DISPLAY BACK LIGHT

FIELD OF THE INVENTION

The present invention relates generally to computers. More particularly, it pertains to the use of waste heat in a computer system.

BACKGROUND OF THE INVENTION

Portable electronics, and in particular lap top computers, have many inherent design challenges, including decreasing package size, increasing complexity, and limited power availability. Another design challenge is the elimination of excess heat that is generated by the electronics. As individual component size decreases and device complexity increases, the amount of excess heat generated in smaller areas increases. The excess heat surrounding the components can reduce the overall life of the components.

One technique used to dissipate heat near the electronic components is to incorporate a fan for directing cooling air over a warm device. However, the use of a fan to move air through a unit is not practical since considerable power is required. Therefore, there has been extensive work in developing effective methods of moving heat from the heat generating components, for example, the CPU, to a heat dissipating component, for example, a heat sink. One such method of moving heat is a heat pipe. These devices effectively move heat from one location to another within the electronic device. However, the heat, a valuable source of thermal energy, is merely dissipated away out into the atmosphere from the electrical components and discharged as waste heat.

In order to reduce power usage for increasing battery life or decreasing battery size for portable computers, design tradeoffs are often implemented to conserve power. Various devices within a portable electronic device are not considered as critical as other devices. One tradeoff commonly used is the use of LCD status displays that do not have back lights. This results in a status display that is useless in low ambient light conditions.

The LCD's using ambient light to illuminate the display are sometimes difficult to view even with high levels of ambient light. Other LCDs are illuminated from the inside so that the visibility of the displayed information is improved. As a result, some electronic devices have LCDs with back lighting. Back lighting the LCDs generally provides a more uniform image and one which is visible regardless of the level of ambient light. However, conventional back lighting requires use of additional power resources to back light the display. Furthermore, conventional lighting methods, such as LEDs, fail to illuminate a broad area of the LCD uniformly.

One approach for illuminating a liquid crystal display device is described in U.S. Pat. No. 5,453,855 issued to Nakamura et al. on Sep. 26, 1995. The '855 patent teaches back lighting an LCD device using a reflective surface in conjunction with a plurality of LEDs. The LEDs, while requiring less power than an incandescent light bulb, nonetheless consume additional system power.

Other types of electronic devices also face design challenges and solutions with respect to back lighting. For instance, electronic watches have been provided with back lighting so that the face, in some cases a liquid crystal display or an analog dial, can be viewed in low levels of ambient light. One solution for back lighting a face of the watch is to include an electroluminescent lamp. However, one of the drawbacks of an electroluminescent lamp is that it requires high voltage alternating current to drive the lamp, thereby requiring additional power from the system.

Accordingly, what is needed is a way to illuminate a display device without consuming additional system power. What is further needed is a useful manner for dissipating excess heat from system components.

SUMMARY OF THE INVENTION

The present invention involves the use of thermoluminescent materials to provide lighting to secondary devices, such as liquid crystal status displays on a portable computer.

In one embodiment, a display apparatus has a back light powered by waste heat. The display apparatus includes an informational display device having a thermal illumination member disposed on a surface of the display device. The display apparatus also includes a heat producing component and a heat conveying unit thermally coupled between the thermal illumination member and the heat producing component. Waste heat from the heat producing component is conveyed to the thermal illumination member. The thermal illumination member provides illumination to the display device when heated in this manner. In another embodiment, the heat producing component and the thermal illumination member incorporates a heat distributing member for evenly distributing the heat.

Another object of the invention is to provide a portable computer having a backlit LCD status display. The portable computer has a computer body, a keyboard in a top surface of the body, and a display. Inside the computer body is a printed circuit board with a CPU having a heat slug, and a heat sink mounted on the heat slug. A status LCD is mounted in the top surface of the computer body, and has two top surfaces forming approximately a ninety-degree angle between them. Alternatively, the two surfaces could be disposed at about a forty-five degree angle, or disposed substantially flush with the computer body. The status LCD projects above the computer body, which facilitates a user's ability to view the status LCD from a normal typing position. Further included in the portable computer is LCD controller circuitry for determining display information for the status LCD and a communication unit for communicating between each status LCD and the LCD controller. The communication unit provides power to the status LCD. Behind a top surface of the status LCD is a thermally illuminated strip. A heat pipe conveys eat from the heat sink on the CPU to the thermally illuminated strip. The thermally illuminated strip provides back lighting to the LCD.

Yet another embodiment of the invention includes a method for backlighting a display apparatus. The method involves providing a display device and a system with a heat producing component, coating a surface of the display device with thermoluminescent material, and conveying waste heat from the heat producing unit to the thermoluminescent material. The waste heat causes the thermoluminescent material to illuminate the display apparatus.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
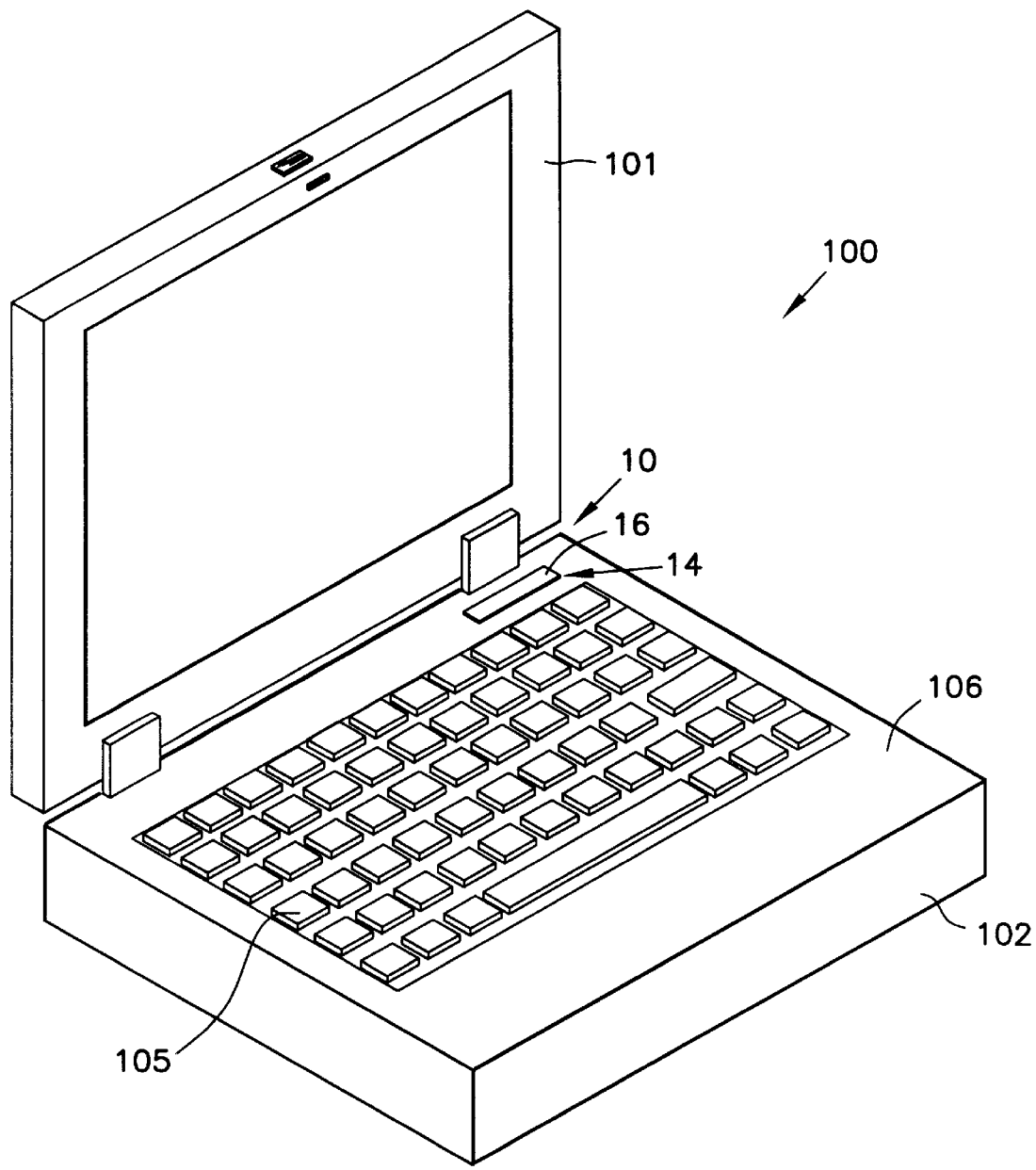
FIG. 1 is a perspective view illustrating a display apparatus in a portable computer constructed in accordance with one embodiment of the present invention.

A display apparatus incorporating a portable computer 100 is shown in FIG. 1. The portable computer 100 is provided having a display 101 rotatably coupled to a rear portion of the portable computer 100. A computer body 102 encompasses the portable computer 100, and provides support for the display 101. The portable computer 100 is designed to be transported, and as such, necessitates a design which is compact and lightweight. Thus, the computer body 102 is packed densely with the internal components, and the number and size of internal components (not shown) are maximized with respect to the area within computer body 102.

Figure 2:
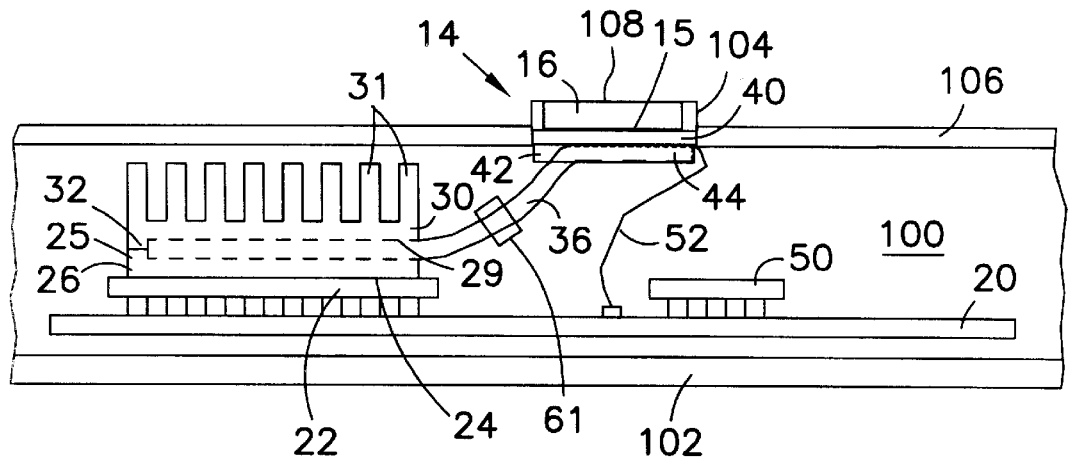
FIG. 2 is a side cut-away view illustrating the display apparatus constructed in accordance with one embodiment of the present invention.

Disposed within the computer body 102, as illustrated in FIG. 2, is a printed circuit board 20 providing an electrical foundation for internal components of the portable computer 100. One main component for the portable computer is a central processing unit (CPU) 22. During operation of the portable computer 100, the CPU 22 generates heat which radiates around an area surrounding the CPU 22. Excess heat surrounding electronic components potentially shortens the life of these components and therefore should be dissipated.

A heat sink 30 is thermally coupled with the CPU 22 for dissipating the heat away from the CPU 22 and surrounding components. Although any type of heat sink could be used, heat sinks normally are comprised of a device having a large surface area for radiating heat into the available area. For instance, one type of heat sink includes a device having several fins extending out from a heat transfer surface connected with a base surface of the heat sink. The heat sink 30 has, in one embodiment, a bore 29 therein. The bore 29 receives the heat pipe 36 therein, as will be further discussed below.

In one embodiment, a heat distribution member 25 is thermally coupled between the CPU 22 and the heat sink 30, to provide a uniform source of heat. In another embodiment, the heat distribution member 25 comprises a heat slug 26. The heat distribution member 25, in one embodiment, is disposed such that a first surface 24 abuts the CPU 22, and a second surface 28 is placed adjacent to the heat sink 30. The heat slug 26 distributes the heat from the CPU 22 across a bottom surface 32 of the heat sink 30. The heat sink 30 draws beat away from the CPU, and distributes the heat evenly into the interior of the computer.

The display apparatus 10 also has a display device 14. A top surface 106 of the computer body 102 has a cut out 104 therein. The cut out 104 is sized to receive the display device 14 therein. The display device 14, in one embodiment, comprises a typical LCD 16 construction, including two parallel and spaced apart glass plates with electrically conductive lines on their inner surfaces. A liquid crystal compound is encased and sealed between the glass plates. The glass plates of the LCD 16 may include commonly known light polarizers for producing an image viewable from an outer surface 108. The liquid crystal compound is clear until subjected to an electric field defined by the conductive lines. The liquid crystals of the compound orient relative to the applied field and act as an additional polarization filter layer according to the pattern of the applied field.

In one embodiment, the display device 14 is parallel with the top surface 106 of the computer body 102. In another embodiment, the display device 14 is substantially flush with the top surface 106 of the computer body 102. In yet another embodiment shown in FIG. 3, the top surface 106 of the computer body has a first and a second surface 110, 112 for projecting the display device 14 above the top surface of the computer body 102. The first surface 110, having the cutout 104 therein for containing the display device, is disposed at an angle to the second surface 112. In one embodiment, the first surface 110 is disposed at approximately a ninety-degree angle to the second surface 112. In another embodiment, the first surface 110 is disposed at approximately a forty-five degree angle to the second surface 112 (not shown).

The LCD 16 is driven by controller circuitry 50 and a communication unit 52, which are both disposed on and electrically connected to the printed circuit board 20. The controller 50 and the communication unit 52 provide signal and power to the LCD 16. The communication unit 52 also provides the necessary information to the LCD 16. Controllers and communication units such as these are known in the art, and therefore will not be specifically discussed.

Referring to FIG. 1, the LCD 16 is placed proximate to a keyboard 105 in the top surface 106 of the portable computer 100, or in other useful areas where a computer user could easily read the information from the display device. Although a portable computer has been described, the lighting apparatus could be implemented in other types of devices, such as printers, fax machines, scanners, or a monitor.

Figure 3:
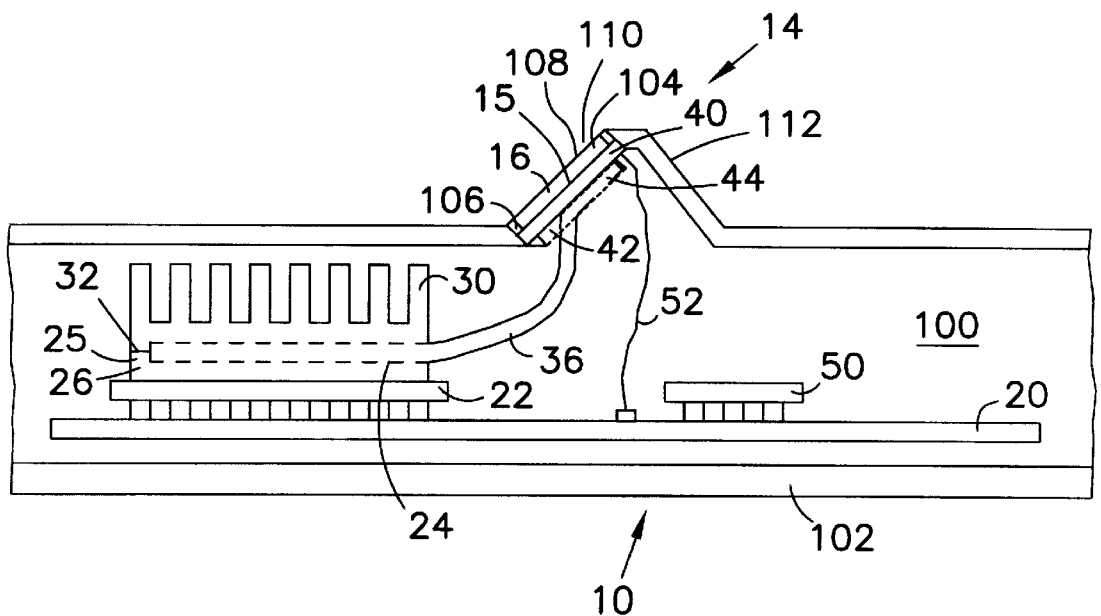
FIG. 3 is a side cut-away view illustrating the display apparatus constructed in accordance with another embodiment of the present invention.

As shown in FIGS. 2 and 3, a thermal illumination member 40 is applied to a surface 15 of the display device 14. In one embodiment, the thermal illumination member 40 is integral with the display device 14. In another embodiment, the thermal illumination member 40 is a coating of thermally illuminescent material. Alternatively, the thermal illumination member 40 comprises a strip of material having thermal illuminescent material embedded therein. In another embodiment, the thermal illumination member 40 comprises thermal illuminescent material laminated or wrapped inside a layer of clear Mylar. Although other types of thermally illuminescent materials are available and considered within the scope of the invention, examples of thermally illuminescent material include lithium fluorene, doped alkaline earth sulfides, or cesium iodine. In addition, the thermal illuminescent material may be coupled with the heat source with a variety of materials and/or structure.

The thermal illumination member 40 is thermally coupled with the heat sink 30 by a heat conveying unit. In one embodiment, the heat conveying unit comprises a heat pipe 36. The heat pipe 36 extends from the heat sink 30 to the thermal illumination member 40. In one embodiment, the heat pipe 36 is thermally coupled with the heat sink 30 in bore 29. In another embodiment, the heat pipe 36 extends from between the heat sink 30 and the first heat slug 26 to the thermal illumination member 40. In yet another embodiment, the heat pipe 36 is placed on top of the heat sink 30 amongst fins 31 of the heat sink 30. The heat is then conveyed from the CPU 22 to the thermal illumination member 40. The high thermal conductivity of a heat pipe enables the heat to be transferred to the thermally illuminated strip 40 at a high efficiency. Heat is transferred away from the CPU 22 and surrounding components, providing additional cooling to the electrical components. The heat transferred from the CPU 22 to the thermal illumination member 40 also illuminates the thermal illumination member 40. The illumination from the thermal illumination member 40 then provides illumination to the LCD 16, thereby back lighting the LCD 16.

For a more uniform distribution, a second heat distribution member 42, such as a heat slug 44, is disposed between the thermal illumination member 40 and the heat pipe 36. The heat slug 44 evenly distributes the heat to the thermal illumination member 40, and evenly distributes the illumination provided to the LCD 16. Alternatively, the illumination could be distributed using a light distribution member (not shown), such as a light pipe.

A computer user may not desire to have backlighting provided to the status LCD. Thus, a door may be provided for covering the status display. Alternatively, a switch can be implemented directing heat away from the thermal illumination member 40. In any event, a adjusting member or device 61 could be provided whereby the illumination could be adjustable or eliminated by the computer user depending on individual need.

Advantageously, the lighting apparatus uses heat generated by the system which would be dissipated or otherwise wasted. The lighting apparatus can also be incorporated into other devices without departing from the scope of the invention. An appropriate application for the lighting apparatus is a device having various electronic components that generate excess heat, and the components should generate a sufficient amount of heat to illuminate a strip of thermally illuminescent material. For instance, the lighting apparatus could be incorporated into stereo equipment, printers, scanners, copy machines, handbook computers, portable computers, displays, and desk top computers. Alternatively, the lighting apparatus could be supplied with waste heat from a source external to the system having the lighting apparatus.

The display apparatus provides an effective way to direct additional heat away from valuable components, such as the CPU. Eliminating excess heat near heat sensitive components often lengthens the life of these components. In addition to removing excess heat from sensitive areas, the lighting apparatus provides a system for back lighting an LCD. The lighting apparatus illuminates a display screen without requiring additional power resources. Moreover, the lighting apparatus provides a uniform illumination of the display screen.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A display apparatus having a backlight provided for by heat, the display apparatus comprising:

a display device for displaying information thereon;

a thermal illumination member disposed proximate to a surface of the display device;

a heat producing component; and a heat conveying unit thermally coupled between the thermal illumination member and the heat producing component, whereby heat is conveyed from the heat producing component to the thermal illumination member.

2. A display apparatus as recited in claim 1, wherein the thermal illumination member is disposed on an outer surface of the display device.

3. A display apparatus as recited in claim 2, wherein the thermal illumination member is disposed on a bottom surface of the display device.

4. A display apparatus as recited in claim 1, wherein the thermal illumination member has thermoluminescent material coupled therewith.

5. A display apparatus as recited in claim 1, the device further comprising an adjusting member whereby the level of backlight illumination is adjustable by a user.

6. A display apparatus having a backlight provide for heat, the display apparatus comprising:

a display device for displaying information thereon, said display device having a thermally illuminescent material formed integrally therein;

a heat producing component; and a heat conveying unit coupled between the display device and the heat producing component, whereby heat is conveyed from the heat producing component to the display device.

7. A display apparatus having a backlight provided for by waste heat, the display apparatus comprising:

a support case having an opening in a first surface;

a display device mounted within the opening of the first surface;

a first heat distributing member disposed proximate to a surface of the display device;

a thermal illumination member disposed between the first heat distributing member and the display device;

a heat producing component;

a second heat distributing member disposed proximate to the heat producing component; and a heat conveying unit thermally coupled between the first heat distributing member with the second heat distributing member, whereby heat is conveyed from the first heat distributing member to the second heat distributing member.

8. The display apparatus as recited in claim 7, wherein the heat producing component is disposed within said support case.

9. The display apparatus as recited in claim 7, wherein the support case encompasses a portable computer.

10. The display apparatus as recited in claim 7, wherein the display device has two top surfaces, said top surfaces disposed at a predetermined angle to each other.

11. The display apparatus as recited in claim 10, wherein the two top surfaces of the display device are disposed at approximately a ninety degree angle to one another for projecting above the first surface of the support case.

12. The display apparatus as recited in claim 7, wherein the display device is substantially flush with the first surface of the support case.

13. The display apparatus as recited in claim 7, wherein the display device is a liquid crystal display device.

14. The display apparatus as recited in claim 7, wherein the first and second heat distributing members are heat slugs.

15. The display apparatus as recited in claim 7, wherein the thermal illumination member is a coating of material having thermal illuminescent qualities, the coating being applied to an inner surface of the display device.

16. The display apparatus as recited in claim 7, wherein the heat conveying unit is a heat pipe.

17. The display apparatus as recited in claim 16, wherein the heat pipe is formed integral with the heat sink and the heat slug.

18. A display apparatus comprising:
   a portable computer having a computer body, the computer body supporting a keyboard in a top surface;
   a display rotatably coupled to a rear portion of the computer body;
   a printed circuit board encompassed by the computer body; said printed circuit board having a heat producing component mounted thereon, said heat producing component electrically connected to said printed circuit board;
   a heat sink for dissipating heat from the heat producing component;
   a first heat slug for distributing heat from the heat producing component, said first heat slug disposed between said heat sink and said heat producing component;
   at least one display device for displaying information, each display device mounted in the top surface of the computer body, each display device having a bottom surface;
   controller circuitry for determining display information for the display device;
   a communication unit for communicating between each display device and the controller circuitry, said communication unit providing power to each display device;
   a thermally illuminated strip proximately disposed to the bottom surface of display device;
   a second heat slug mounted proximate to the thermally illuminated strip, said second heat slug for evenly distributing heat; and
   a heat pipe for conveying heat from the heat sink and the first heat slug to a second heat slug, whereby the thermally illuminated strip is illuminated by the conveyed heat.

19. A display apparatus as recited in claim 18, wherein the heat producing component comprises a central processing unit.

20. A display apparatus as recited in claim 18, wherein the display device comprises a status liquid crystal display.

21. The display apparatus as recited in claim 18, wherein the display device has a first top surface and a second top surface, the first top surface forming approximately a forty-five degree angle with the second top surface whereby the display device projects above the top surface of the computer body.

22. The display apparatus as recited in claim 18, wherein the display device has a first top surface and a second top surface, the first top surface forming approximately a ninety degree angle with the second top surface whereby the display device projects above the top surface of the computer body.

23. The display apparatus as recited in claim 18, wherein the display device is substantially flush with the top surface of the computer body.

24. A method for backlighting a display apparatus, the method comprising the steps of:
   providing a display device proximate to a system having a heat producing unit;
   coating a substantial portion of a surface of the display device with thermoluminescent material; and
   conveying waste heat from the heat producing unit proximate to the thermoluminescent material, whereby the material becomes illuminated.

25. The method for backlighting a display apparatus as recited in claim 24, wherein the step of conveying waste heat from the heat producing unit includes distributing the waste heat across the coated surface of the display device.

26. The method for backlighting a display apparatus as recited in claim 24, wherein the step of conveying waste heat from the heat producing unit includes distributing the waste heat over the heat producing unit.

27. The method for backlighting a display apparatus as recited in claim 24, wherein the step of providing a display device proximate to a system having a heat producing unit includes displaying information on the display apparatus.

* * * * *